(12) United States Patent
Kojima

(10) Patent No.: US 8,567,462 B2
(45) Date of Patent: *Oct. 29, 2013

(54) RUBBER COMPOSITION FOR STUDLESS TIRE AND STUDLESS TIRE

(75) Inventor: Ryoji Kojima, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,332

(22) Filed: Aug. 23, 2011

(65) Prior Publication Data

US 2012/0048438 A1    Mar. 1, 2012

(30) Foreign Application Priority Data

Aug. 24, 2010    (JP) ................................ 2010-187449

(51) Int. Cl.
*B60C 11/00* (2006.01)
*B60C 1/00* (2006.01)
*C08K 3/04* (2006.01)

(52) U.S. Cl.
USPC .................... 152/209.1; 524/495; 524/588

(58) Field of Classification Search
USPC .................... 524/493; 523/156; 152/209.1
IPC .............. B06C 1/00,11/00; C08K 3/34
See application file for complete search history.

(56) References Cited

U.S. PATENT DOCUMENTS

| 8,022,132 B2* | 9/2011 | Kojima | 524/526 |
| 2011/0112215 A1* | 5/2011 | Kojima | 523/158 |

FOREIGN PATENT DOCUMENTS

| EP | 0 502 728 A1 | 9/1992 |
| JP | 4-277539 A | 10/1992 |
| JP | 6-271706 A | 9/1994 |
| JP | 2003-320804 A | 11/2003 |
| JP | 2004-182905 A | 7/2004 |
| JP | 2006-188571 A | 7/2006 |
| JP | 2006-274045 A | 10/2006 |
| JP | 2006-306930 A | 11/2006 |
| JP | 2006-348222 A | 12/2006 |
| JP | 2007-277437 A | 10/2007 |
| JP | 2007277437 A * | 10/2007 |
| JP | 2008013650 A * | 1/2008 |
| JP | 2008-50432 A | 3/2008 |
| JP | 2008-120937 A | 5/2008 |
| JP | 2008-127453 A | 6/2008 |
| JP | 2008-303332 A | 12/2008 |
| JP | 2008-308575 A | 12/2008 |
| JP | 2008308575 A * | 12/2008 |
| JP | 2009-249594 A | 10/2009 |
| JP | 2009-275152 A | 11/2009 |
| JP | 2010-59251 A | 3/2010 |
| JP | 2011-12161 A | 1/2011 |

OTHER PUBLICATIONS

JP 2008-013650 A (2008), machine translation, JPO Advanced Industrial Property Network (AIPN).*
Varughese et al., "Effect of plasticizer type and concentration on the dynamic mechanical properties of epoxidized natural rubber vulcanizates," J. Elastomers and Polymers, vol. 25 (1993), pp. 343-357.*
Milne, G. W. A., Ed., "Thiohexam," Dictionary in Gardner's Commercially Important Chemicals: Synonyms, Trade Names, and Properties, John Wiley & Sons, Inc., Hoboken, NJ, USA (2005), p. 616-617.*
JP 2007-277437 A (2007), machine translation, JPO Advanced Industrial Property Network (AIPN).*
JP 2008-308575 A (2008), machine translation, JPO Advanced Industrial Property Network (AIPN).*

* cited by examiner

*Primary Examiner* — David W Wu
*Assistant Examiner* — Josephine Chang
(74) *Attorney, Agent, or Firm* — Birch, Stewart, Kolasch & Birch, LLP

(57) ABSTRACT

A rubber composition for a studless tire capable of improving the performance on snow and ice, wet performance, abrasion resistance in good balance, and a studless tire having a tread produced from the rubber composition is disclosed. The rubber composition for a studless tire includes a rubber component including modified natural rubber and butadiene rubber; aromatic oil; silica; and carbon black, wherein the amount of the aromatic oil is 15 to 80 parts by mass and the amount of the silica is 15 to 80 parts by mass, relative to 100 parts by mass of the rubber component.

10 Claims, No Drawings

RUBBER COMPOSITION FOR STUDLESS TIRE AND STUDLESS TIRE

TECHNICAL FIELD

The present invention relates to a rubber composition for a studless tire (winter tire) and a studless tire.

BACKGROUND ART

Spike tires or chained tires for driving snow and ice covered roads have been used on vehicles. This, however, causes environmental problems such as dust pollution, and therefore studless tires have been developed. Studless tires have been improved in their materials and designs. For example, a rubber composition that contains a large amount of mineral oil and diene rubber having excellent low-temperature properties is used. However, if the amount of mineral oil is increased, the abrasion resistance usually deteriorates.

Meanwhile, along with the recent global warming, vehicles with studless tires are driven increasingly on paved roads. Therefore, improvement in total performance including dry performance and wet performance of studless tires is demanded. In particular, improvement in wet performance of tires is strongly demanded as it affects the safety of driving. On the other hand, further improvement in performance on snow and ice of tires is demanded, and thus the glass transition temperature of tread rubber compositions tends to be set low. In this case, it is difficult to simultaneously secure the wet performance. Thus, it is difficult for the conventional art to improve the performance on snow and ice, wet performance, and abrasion resistance in good balance.

Patent Documents 1 to 3 disclose rubber compositions including epoxidized polyisoprene, epoxidized natural rubber, or the like. However, the rubber compositions are not intended to improve the performance on snow and ice. Further, the rubber compositions are insufficient means for improving the performance on snow and ice, wet performance, and abrasion resistance in good balance.

Patent Document 1: JP 2006-188571 A
Patent Document 2: JP 2006-348222 A
Patent Document 3: JP 2008-303332 A

SUMMARY OF THE INVENTION

The present invention is intended to solve the above problems and to provide a rubber composition for a studless tire capable of improving the performance on snow and ice, wet performance, and abrasion resistance in good balance, and a studless tire having a tread produced from the rubber composition.

The present invention relates to a rubber composition for a studless tire, including: a rubber component including modified natural rubber and butadiene rubber; aromatic oil; silica; and carbon black, wherein the amount of the aromatic oil is 15 to 80 parts by mass and the amount of the silica is 15 to 80 parts by mass, relative to 100 parts by mass of the rubber component.

The modified natural rubber is preferably epoxidized natural rubber.

The amount of the epoxidized natural rubber is preferably 1 to 60% by mass based on 100% by mass of the rubber component.

The epoxidized natural rubber preferably has an epoxidation degree of 2 to 35 mol %.

The rubber composition for a studless tire preferably further includes natural rubber.

The amount of the silica is preferably 50% by mass or more based on 100% by mass of the sum of the amounts of the silica and the carbon black.

The present invention also relates to a studless tire having a tread produced from the rubber composition.

According to the present invention, the rubber composition for a studless tire includes a rubber component including modified natural rubber and butadiene rubber; aromatic oil; silica; and carbon black, and contains large amounts of the aromatic oil and silica. As a result, the balance of the performance on snow and ice, wet performance, and abrasion resistance can be remarkably improved. Thus, a studless tire having a tread produced from the rubber composition can achieve high levels of these performances in good balance.

BEST MODE FOR CARRYING OUT THE INVENTION

The rubber composition for a studless tire according to the present invention includes a rubber component including modified natural rubber and butadiene rubber (BR); aromatic oil; silica; and carbon black, and contains the predetermined amounts of the aromatic oil and silica. That is, modified natural rubber and butadiene rubber are used in combination as a rubber component, and relatively large amounts of aromatic oil and silica are added.

According to the present invention, the combination of butadiene rubber and modified natural rubber such as epoxidized natural rubber increases the hysteresis loss of the polymers themselves. Therefore, the wet performance can be improved without decreasing the performance on snow and ice.

As mentioned above, use of mineral oil ensures sufficient performance on snow and ice because of its good low-temperature properties, but it deteriorates abrasion resistance. Accordingly, these performances cannot be achieved at the same time. Also, use of aromatic oil instead of the mineral oil causes deterioration of the low-temperature properties, and the performance on snow and ice is therefore insufficient. In contrast, according to the present invention, the combination of large amounts of aromatic oil and silica allows improvement in low-temperature properties without reducing abrasion resistance, and thus the performance on snow and ice and abrasion resistance can be achieved at the same time. In addition, the tan δ in a low-temperature region is increased and the wet performance can be significantly improved.

Thus, according to the present invention, BR and modified natural rubber such as ENR are used in combination and large amounts of aromatic oil and silica are added, which can significantly improve the balance of the performance on snow and ice, wet performance, and abrasion resistance.

Examples of the modified natural rubber preferably include, but not limited to, epoxidized natural rubber (ENR). The use of ENR improves wet performance without greatly increasing the hardness of the rubber composition at low temperatures, so that the above-mentioned performances can be achieved in good balance.

The ENR is not particularly limited, and commercially available epoxidized natural rubbers may be used, or it may be prepared by epoxidizing natural rubber (NR). Examples of the process of epoxidizing natural rubber include, but not limited to, the chlorohydrin process, the direct oxidation process, the hydrogen peroxide process, the alkyl hydroperoxide process, and the peracid process.

Examples of the natural rubber to be epoxidized include, but not limited to, those commonly used in the tire industry, such as SIR20, RSS#3, TSR20, deproteinized natural rubber (DPNR), and highly purified natural rubber (HPNR).

The epoxidation degree of the ENR is preferably 2 mol % or more, more preferably 3 mol % or more, and still more preferably 5 mol % or more. If the epoxidation degree is less than 2 mol %, the wet performance may not be sufficiently improved. The epoxidation degree is preferably 35 mol % or less, more preferably 25 mol % or less, and still more preferably 15 mol % or less. If the epoxidation degree is more than 35 mol %, the performance on snow and ice tends to deteriorate.

In the present invention, the epoxidation degree means a proportion (mol %) of the number of epoxidized double bonds to the total number of double bonds in rubber before epoxidized. The epoxidation degree can be determined by the method described in EXAMPLES mentioned later.

The amount of the ENR is preferably 1% by mass or more, more preferably 5% by mass or more, and still more preferably 10% by mass or more, based on 100% by mass of the rubber component. If the amount is less than 1% by mass, the wet performance may not be sufficiently improved. The amount of the ENR is preferably 60% by mass or less, more preferably 50% by mass or less, and still more preferably 40% by mass or less, based on 100% by mass of the rubber component. If the amount is more than 60% by mass, the Tg tends to increase, likely resulting in deterioration of the performance on snow and ice.

The rubber composition of the present invention contains BR. The BR is not particularly limited, and those commonly used in the tire industry may be used. BRs having a cis content of 90% by mass or more are preferably used for securing sufficient low-temperature properties.

The BR preferably has a Mooney viscosity ($ML_{1+4}$ (100° C.)) of 10 or more, and more preferably 30 or more. If the Mooney viscosity is less than 10, the dispersibility of filler tends to be lowered. The Mooney viscosity of the BR is preferably 120 or less, and more preferably 80 or less. If the Mooney viscosity is more than 120, rubber scorch (discoloration) may occur in extrusion processing.

The molecular weight distribution (Mw/Mn) of the BR is preferably 1.5 or more, and more preferably 2.5 or more. If the Mw/Mn of the BR is less than 1.5, the processability may deteriorate. The Mw/Mn of the BR is preferably 5.0 or less, and more preferably 4.0 or less. If the Mw/Mn of the BR is more than 5.0, the abrasion resistance tends to deteriorate.

In the present invention, Mn and Mw are determined relative to polystyrene standards by GPC.

In order to allow the rubber composition to have the required performance on snow and ice, the amount of the BR is preferably 10% by mass or more, more preferably 20% by mass or more, still more preferably 30% by mass or more, and particularly preferably 50% by mass or more, based on 100% by mass of the rubber component. In order to improve processability, the amount of the BR is preferably 80% by mass or less, more preferably 70% by mass or less, and still more preferably 60% by mass or less, based on 100% by mass of the rubber component.

Examples of usable rubbers other than ENR and BR include natural rubber (NR), styrene butadiene rubber (SBR), styrene isoprene butadiene rubber (SIBR), ethylene propylene diene rubber (EPDM), chloroprene rubber (CR), acrylonitrile butadiene rubber (NBR), and a halogenated copolymer of an isomonoolefin and a para-alkylstyrene. NR is particularly preferably used. It is to be noted that the NR is not particularly limited and those commonly used in the tire industry may be used.

The total amount of the BR, ENR and NR is preferably 80% by mass or more, more preferably 90% by mass or more, and still more preferably 100% by mass, based on 100% by mass of the rubber component. Such a range leads to both good wet performance and high performance on snow and ice, and therefore the above-mentioned performances can be improved in good balance.

In the present invention, comparatively large amounts of aromatic oil and silica are used. Addition of silica together with aromatic oil to the modified natural rubber, such as ENR, leads to both good abrasion resistance and high performance on snow and ice, and at the same time improves wet grip performance which is poor in a conventional studless tire.

The aromatic oil preferably has an aromatic hydrocarbon content in mass percentage, which is determined in accordance with ASTM D2140, of 15% by mass or more, for example. To put it more clearly, process oil contains an aromatic hydrocarbon ($C_A$), a paraffinic hydrocarbon ($C_P$), and a naphthenic hydrocarbon ($C_N$) in terms of its molecular structure. Process oil is roughly classified as aromatic oil, paraffinic oil, or naphthenic oil, based on the contents of $C_A$ (% by mass), $C_P$ (% by mass), and $C_N$ (% by mass). The aromatic oil used in the present invention preferably has a $C_A$ content of 15% by mass or more, and more preferably 17% by mass or more. Also, the aromatic oil preferably has a $C_A$ content of 70% by mass or less, and more preferably 65% by mass or less.

Examples of commercially available aromatic oils include AC-12, AC-460, AH-16, AH-24 and AH-58 produced by Idemitsu Kosan Co., Ltd., and Process NC300S produced by Japan Energy Corporation.

The amount of the aromatic oil is preferably 15 parts by mass or more, more preferably 30 parts by mass or more, still more preferably 45 parts by mass or more, and particularly preferably 60 parts by mass or more, relative to 100 parts by mass of the rubber component. A larger amount of the aromatic oil leads to a better softening effect and better low-temperature properties, which results in improvement in performance on snow and ice. The amount of the aromatic oil is preferably 80 parts by mass or less. An amount of the aromatic oil of more than 80 parts by mass may deteriorate properties such as processability, abrasion resistance, and aging resistance.

Examples of the silica include, but not limited to, silica produced by a wet process and silica produced by a dry process.

The nitrogen adsorption specific surface area ($N_2SA$) of the silica is preferably 80 m²/g or larger, and more preferably 150 m²/g or larger. An $N_2SA$ of the silica of smaller than 80 m²/g may result in a great deterioration in tensile strength and make it difficult to secure abrasion resistance. Also, the $N_2SA$ of the silica is preferably 250 m²/g or smaller, and more preferably 180 m²/g or smaller. An $N_2SA$ of the silica of larger than 250 m²/g may greatly increase the viscosity of the resulting rubber composition and deteriorate processability.

Here, the $N_2SA$ of the silica can be determined by the BET method in accordance with ASTM D3037-81.

The amount of the silica is preferably 15 parts by mass or more, more preferably 30 parts by mass or more, and still more preferably 45 parts by mass or more, relative to 100 parts by mass of the rubber component. An amount of the silica of less than 15 parts by mass may not result in improvement in performance on snow and ice. The amount of the silica is preferably 80 parts by mass or less, more preferably 70 parts by mass or less, and still more preferably 60 parts by mass or less, relative to 100 parts by mass of the rubber component. An amount of the silica of more than 80 parts by mass may deteriorate processability and workability, and lead to poor low-temperature properties due to an increase in the filler amount.

The rubber composition preferably contains a silane coupling agent together with the silica. Examples of the silane coupling agent include, but not limited to, those conventionally used in the tire industry, such as sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. Particularly preferable are sulfide-type silane coupling agents such as bis(3-triethoxysilylpropyl)tetrasulfide, bis(2-triethoxysilylethyl)tetrasulfide, bis(3-triethoxysilylpropyl) disulfide, and bis(2-triethoxysilylethyl) disulfide.

The amount of the silane coupling agent is preferably 2 parts by mass or more, and more preferably 5 parts by mass or more, relative to 100 parts by mass of the silica. The amount of the silane coupling agent is preferably 20 parts by mass or less, and more preferably 15 parts by mass or less. An amount of the silane coupling agent within such a range leads to favorable achievement of the effects of the present invention.

The rubber composition of the present invention contains carbon black, which provides reinforcement. Also, addition of carbon black together with the aromatic oil and silica to the modified natural rubber and BR improves abrasion resistance, the performance on snow and ice, and wet grip performance in good balance. Examples of the carbon black include, but not limited to, SAF, ISAF, HAF, FF, and GPF.

The carbon black preferably has an average particle size of 31 nm or smaller and/or a DBP oil absorption of 100 ml/100 g or more. Addition of such carbon black provides the required reinforcement, secures block rigidity, uneven-wear resistance, and tensile strength, and leads to favorable achievement of the effects of the present invention.

An average particle size of the carbon black of larger than 31 nm may lead to a great deterioration in tensile strength and make it difficult to secure abrasion resistance. The average particle size of the carbon black is more preferably 25 nm or smaller, and still more preferably 23 nm or smaller. Also, the average particle size of the carbon black is preferably 15 nm or larger, and more preferably 19 nm or larger. An average particle size of the carbon black of smaller than 15 nm may greatly increase the viscosity of the resulting rubber composition, and deteriorate processability. In the present invention, the average particle size is a number-average particle size, and can be measured with a transmission electron microscope.

A DBP oil absorption (dibutyl phthalate oil absorption) of the carbon black of less than 100 ml/100 g may lead to low reinforcement and make it difficult to secure abrasion resistance. The DBP oil absorption is more preferably 105 ml/100 g or more, and still more preferably 110 ml/100 g or more. Also, the DBP oil absorption is preferably 160 ml/100 g or less, and more preferably 150 ml/100 g or less. Carbon black having a DBP oil absorption of more than 160 ml/100 g would be difficult to produce in the first place.

Here, the DBP oil absorption of the carbon black can be measured in accordance with the measuring method described in JIS K6217-4.

The nitrogen adsorption specific surface area ($N_2SA$) of the carbon black is preferably 80 $m^2/g$ or larger, and more preferably 110 $m^2/g$ or larger. An $N_2SA$ of smaller than 80 $m^2/g$ may lead to a great deterioration in tensile strength and make it difficult to secure abrasion resistance. Also, the $N_2SA$ of the carbon black is preferably 200 $m^2/g$ or smaller, and more preferably 150 $m^2/g$ or smaller. An $N_2SA$ of larger than 200 $m^2/g$ may greatly increase the viscosity of the resulting rubber composition, and thus deteriorate processability.

Here, the $N_2SA$ of the carbon black can be determined in accordance with the method A described in JIS K6217.

The amount of the carbon black is preferably 2 parts by mass or more, and more preferably 5 parts by mass or more, relative to 100 parts by mass of the rubber component. An amount of the carbon black of less than 2 parts by mass may lead to low reinforcement. The amount of the carbon black is preferably 50 parts by mass or less, more preferably 20 parts by mass or less, and still more preferably 15 parts by mass or less. An amount of the carbon black of more than 50 parts by mass tends to lead to poor low-temperature properties.

The amount (proportion) of the silica is preferably 50% by mass or more, and more preferably 55% by mass or more, based on 100% by mass of the sum of the amounts of the silica and the carbon black. An amount of the silica of less than 50% by mass may not result in achievement of both high performance on snow and ice and good abrasion resistance, so that the effects of the present invention may not be sufficiently exerted. The amount of the silica is preferably 95% by mass or less, and more preferably 90% by mass or less, based on 100% by mass of the sum of the amounts of the silica and the carbon black. An amount of the silica of more than 95% by mass may lead to a great deterioration in weather resistance and ozone resistance.

The rubber composition may optionally contain compounding ingredients generally used in the rubber industry, in addition to the above ingredients. Examples of the compounding ingredients include other fillers, stearic acid, antioxidants, age resistors, zinc oxide, peroxides, vulcanizing agents such as sulfur and sulfur-containing compounds, and vulcanization accelerators.

Preferable vulcanization accelerators are sulfenamide vulcanization accelerators (such as N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and N,N-diisopropyl-2-benzothiazole sulfenamide), and guanidine vulcanization accelerators (such as diphenylguanidine (DPG), di-o-tolylguanidine, triphenylguanidine, o-tolylbiguanide, and diphenylguanidine phthalate). Among these, a combination of TBBS and DPG is particularly preferable.

The rubber composition of the present invention can be suitably used for treads of studless tires. Further, the rubber composition is particularly preferably used for studless tires for passenger vehicles which require high handling stability on snow and ice although it is also applicable to vehicles such as trucks and buses.

A studless tire can be produced with the rubber composition of the present invention by a usual method. That is, the studless tire can be produced by preparing a tire component such as a tread from the rubber composition, assembling the prepared component with other components, and heating the assembly under pressure on a tire building machine.

EXAMPLES

The present invention will be more specifically described based on Examples, but the present invention is not intended to be limited to these Examples.

In the following, the respective chemical agents used in Examples and Comparative Examples are listed.
NR: RSS#3
ENR2: See Preparation Example 1.
ENR5: See Preparation Example 2.
ENR10: See Preparation Example 3.

ENR25: See Preparation Example 4.
ENR35: See Preparation Example 5.
BR: BR150B (cis-1,4 bond content: 97% by mass, $ML_{1+4}$ (100° C.) 40, viscosity of 5% solution in toluene at 25° C.: 48 cps, Mw/Mn: 3.3) produced by Ube Industries, Ltd.
Carbon black: N220 ($N_2SA$: 120 $m^2/g$, average particle size: 23 nm, DBP oil absorption: 115 ml/100 g) produced by Cabot Japan K.K.
Silica: Ultrasil VN3 ($N_2SA$: 175 $m^2/g$) produced by Degussa AG
Silane coupling agent: Si266 (bis (3-triethoxysilylpropyl) disulfide) produced by Degussa AG
Mineral oil: PS-32 (paraffinic process oil) produced by Idemitsu Kosan Co., Ltd.
Aromatic oil: Process oil NC300S (aromatic hydrocarbon ($C_A$)
content: 29% by mass) produced by Japan Energy Corporation
Stearic acid: Kiri produced by NOF Corporation
Zinc oxide: Zinc oxide #2 produced by Mitsui Mining & Smelting Co., Ltd.
Age resistor: NOCRAC 6C (N-(1,3-dimethylbutyl)-N'-phenyl-p-phenylenediamine) produced by Ouchi Shinko Chemical Industrial Co., Ltd.
Wax: OZOACE wax produced by Nippon Seiro Co., Ltd.
Sulfur: Sulfur powder produced by Tsurumi Chemical Industry Co., Ltd.
Vulcanization accelerator TBBS: NOCCELER NS (N-tert-butyl-2-benzothiazolylsulfenamide) produced by Ouchi Shinko Chemical Industrial Co., Ltd.
Vulcanization accelerator DPG: NOCCELER D (N,N'-diphenylguanidine) produced by Ouchi Shinko Chemical Industrial Co., Ltd.

Preparation Example 1

Preparation of ENR2

ENR2 was prepared in the same manner as in Preparation Example 2 below, except that the amount of peracetic acid and the reaction time were changed.

Preparation Example 2

Preparation of ENR5

An amount of 1500 g of high ammonia natural rubber latex (Hytex available from Nomura Trading Co., Ltd., solid content: 60%) was introduced into a 5-L container equipped with a stirrer, a dropping funnel and a condenser. The rubber latex was diluted with 1.5 L of distilled water so that the solid content of the mixture was set to 30%, and the temperature was adjusted to 20° C. An amount of 9 g of a nonionic emulsifier (EMULGEN 106 produced by Kao Corporation) was added to the mixture with stirring. Then, 800 g of a peracetic acid solution having a concentration of 2.5 mol/L was slowly added while the pH of the latex mixture was adjusted with 2.8% aqueous ammonia to the range of 5 to 6. After the addition, the reaction was carried out at room temperature for five hours. Then, formic acid or methanol was added thereto little by little and only the rubber component was coagulated. The coagulated mass was washed with distilled water several times and dried, whereby ENR5 was prepared.

Preparation Example 3

Preparation of ENR10

ENR10 was prepared in the same manner as in Preparation Example 2 mentioned above, except that the amount of peracetic acid and the reaction time were changed.

Preparation Example 4

Preparation of ENR25

ENR25 was prepared in the same manner as in Preparation Example 2 mentioned above, except that the amount of peracetic acid and the reaction time were changed.

Preparation Example 5

Preparation of ENR35

ENR35 was prepared in the same manner as in Preparation Example 2 mentioned above, except that the amount of peracetic acid and the reaction time were changed.

Each of the ENRs prepared in Preparation Examples 1 to 5 was dissolved in deuterated chloroform, and nuclear magnetic resonance (NMR (JNM-ECA series, produced by JEOL Ltd.)) spectrometric analysis was carried out to obtain integral values h (ppm) of the peak area of carbon-carbon double bond moiety and of the peak area of aliphatic moiety. The epoxidation degree of each ENR was determined from the ratio of the obtained integral values h by the following formula: (Epoxidation degree)=$3 \times h(2.69)/(3 \times h(2.69)+3 \times h(5.14)+h(0.87)) \times 100$.

The obtained epoxidation degree of each ENR is shown below.
ENR2: 2 mol %
ENR5: 5 mol %
ENR10: 10 mol %
ENR25: 25 mol %
ENR35: 35 mol %

Examples 1 to 9 and Comparative Examples 1 to 6

The chemical agents were put into a Banbury mixer in the amounts shown in Process 1 of Table 1. They were mixed for five minutes so as to raise the outlet temperature to about 150° C. (It is noted that the mineral oil was added in two portions). Thereafter, the sulfur and the vulcanization accelerators in the amounts shown in Process 2 were added to the mixture obtained in Process 1, and they were mixed for three minutes at about 80° C. with an open roll mill, whereby an unvulcanized rubber composition was produced. The obtained unvulcanized rubber composition was press-vulcanized for ten minutes at 170° C., so that a vulcanized rubber composition (vulcanized rubber sheet) was produced.

Also, the obtained unvulcanized rubber composition was molded into a tread shape and assembled with other tire components. Then, the assembly was vulcanized for 15 minutes at 170° C., so that a test studless tire was produced.

The vulcanized rubber sheets and the test studless tires were evaluated in the following ways.

(1) Hardness

In accordance with JIS K6253 "Rubber, vulcanized or thermoplastic—Determination of hardness", the hardness of the vulcanized rubber sheets was determined at 0° C. with a type A durometer. The determined values of hardness each are expressed as an index based on the value of Comparative Example 1 taken as 100. A smaller index value indicates a lower hardness, and better low-temperature properties.

(2) Glass Transition Temperature (Tg)

A test piece of a predetermined size was cut out from each of the vulcanized rubber sheets. Then, the temperature dependence curve of tan δ at from −100° C. to 100° C. of each test piece was determined with a viscoelasticity spectrometer VES (produced by Iwamoto Seisakusho Co., Ltd.) under the following conditions: an initial strain of 10%; a dynamic strain of 0.5%; a frequency of 10 Hz and an amplitude of ±0.25%; and a temperature increase rate of 2° C./min. From the obtained temperature dependence curve, the tan δ peak temperature was determined, and this temperature was taken as Tg.

(3) Performance on Snow and Ice

The test studless tires were evaluated for on-vehicle performance on snow and ice under the following conditions. Here, studless tires for passenger vehicles having a size of 195/65R15 and a DS-2 pattern were produced as the test studless tires, and each set of tires was mounted on a 2000-cc FR car made in Japan. The test was run on a test course of Sumitomo Rubber Industries, Ltd. in Nayoro, Hokkaido, Japan. The temperature on ice was from −6° C. to −1° C. and the temperature on snow was from −10° C. to −2° C.

Braking performance (brake stopping distance on ice): The brake stopping distance on ice, which is a distance required for the car to stop after the brakes that lock up were applied at 30 km/h, was measured. Then, with Comparative Example 1 taken as a reference, the braking performance index was calculated from the following formula.

(Braking performance index)=(Brake stopping distance in Comparative Example 1)/(Brake stopping distance of each tire)×100

The larger the index, the better the braking performance.

(4) Wet Performance

With the above test studless tires (tire size: 195/65R15), an actual vehicle running test was performed on a test course with a wet asphalt surface. In the test, grip performance (grip feeling, brake performance, traction performance) was evaluated by feeling. In the evaluation, the tire in Comparative Example 1 was regarded as the standard, performance of which was graded 100. Then, grading was performed in such a manner that tires were graded 120 if the test driver judged that their performance was obviously improved, and tires were graded 140 if the test driver judged that their performance was at a high level never achieved before.

(5) Abrasion Resistance

Each set of test studless tires (tire size: 195/65R15) was mounted on an FF car made in Japan, and the depth of grooves on the tire tread was measured after the car had run 8000 km. From the measured value, the running distance that made the depth of tire grooves decrease by 1 mm was calculated, and then the obtained value of running distance was used in the following formula to calculate the abrasion resistance index.

(Abrasion resistance index)=(Running distance that made tire groove depth decrease by 1 mm for each tire)/(Running distance that made tire groove depth decrease by 1 mm for Comparative Example 1)×100

The larger the index, the better the abrasion resistance.

Table 1 shows the evaluation results of the respective tests.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Formulation (parts by mass) | Process 1 | NR | — | — | — | — | — | 10 | 20 | 30 | 40 |
| | | ENR2 | 50 | — | — | — | — | — | — | — | — |
| | | ENR5 | — | 50 | — | — | — | — | — | — | — |
| | | ENR10 | — | — | 50 | — | — | 40 | 30 | 20 | 10 |
| | | ENR25 | — | — | — | 50 | — | — | — | — | — |
| | | ENR35 | — | — | — | — | 50 | — | — | — | — |
| | | BR150B | 50 | 50 | 50 | 50 | 50 | 50 | 50 | 50 | 50 |
| | | Carbon black | 5 | 5 | 5 | 5 | 5 | 5 | 5 | 5 | 5 |
| | | Silica | 60 | 60 | 60 | 60 | 60 | 60 | 60 | 60 | 60 |
| | | Silane coupling agent | 4.8 | 4.8 | 4.8 | 4.8 | 4.8 | 4.8 | 4.8 | 4.8 | 4.8 |
| | | Mineral oil | — | — | — | — | — | — | — | — | — |
| | | Aromatic oil | 60 | 60 | 60 | 60 | 60 | 60 | 60 | 60 | 60 |
| | | Stearic acid | 2 | 2 | 2 | 2 | 2 | 2 | 2 | 2 | 2 |
| | | Zinc oxide | 3 | 3 | 3 | 3 | 3 | 3 | 3 | 3 | 3 |
| | | Age resistor | 2 | 2 | 2 | 2 | 2 | 2 | 2 | 2 | 2 |
| | | Wax | 2 | 2 | 2 | 2 | 2 | 2 | 2 | 2 | 2 |
| | Process 2 | Sulfur | 1.5 | 1.5 | 1.5 | 1.5 | 1.5 | 1.5 | 1.5 | 1.5 | 1.5 |
| | | Vulcanization accelerator TBBS | 1.5 | 1.5 | 1.5 | 1.5 | 1.5 | 1.5 | 1.5 | 1.5 | 1.5 |
| | | Vulcanization accelerator DPG | 1 | 1 | 1 | 1 | 1 | 1 | 1 | 1 | 1 |
| Evaluation | | Hardness (0° C.) | 100 | 100 | 101 | 102 | 103 | 101 | 101 | 100 | 100 |
| | | Tg (° C.) | −63 | −61 | −59 | −57 | −55 | −60 | −61 | −62 | −64 |
| | | Performance on snow and ice | 100 | 99 | 99 | 97 | 97 | 99 | 99 | 100 | 100 |
| | | Wet performance | 102 | 104 | 106 | 108 | 112 | 106 | 105 | 104 | 103 |
| | | Abrasion resistance | 100 | 100 | 99 | 98 | 97 | 100 | 100 | 100 | 100 |

| | | | Comparative Example 1 | Comparative Example 2 | Comparative Example 3 | Comparative Example 4 | Comparative Example 5 | Comparative Example 6 |
|---|---|---|---|---|---|---|---|---|
| Formulation (parts by | Process 1 | NR | 50 | 50 | 50 | — | — | — |
| | | ENR2 | — | — | — | 50 | 50 | 50 |

TABLE 1-continued

| | | | | | | | | |
|---|---|---|---|---|---|---|---|---|
| mass) | | ENR5 | — | — | — | — | — | — |
| | | ENR10 | — | — | — | — | — | — |
| | | ENR25 | — | — | 50 | — | — | — |
| | | ENR35 | — | — | — | — | — | — |
| | | BR150B | 50 | 50 | — | 50 | 50 | 50 |
| | | Carbon black | 5 | 20 | 20 | 5 | 50 | 5 |
| | | Silica | 60 | 20 | 20 | 60 | — | 100 |
| | | Silane coupling agent | 4.8 | 1.6 | 1.6 | 1.6 | 1.6 | 1.6 |
| | | Mineral oil | — | 20 | 20 | 20 | 20 | 20 |
| | | Aromatic oil | 60 | — | — | 100 | 60 | 60 |
| | | Stearic acid | 2 | 2 | 2 | 2 | 2 | 2 |
| | | Zinc oxide | 3 | 3 | 3 | 3 | 3 | 3 |
| | | Age resistor | 2 | 2 | 2 | 2 | 2 | 2 |
| | | Wax | 2 | 2 | 1 | 1 | 1 | 1 |
| | Process 2 | Sulfur | 1.5 | 1.5 | 1.5 | 1.5 | 1.5 | 1.5 |
| | | Vulcanization accelerator TBBS | 1.5 | 1.5 | 1.5 | 1.5 | 1.5 | 1.5 |
| | | Vulcanization accelerator DPG | 1 | 1 | 1 | 1 | 1 | 1 |
| Evaluation | | Hardness (0° C.) | 100 | 98 | 100 | 80 | 105 | 115 |
| | | Tg (° C.) | −65 | −60 | −50 | −70 | −65 | −65 |
| | | Performance on snow and ice | 100 | 95 | 92 | 115 | 85 | 80 |
| | | Wet performance | 100 | 75 | 83 | 85 | 80 | 105 |
| | | Abrasion resistance | 100 | 65 | 60 | 60 | 105 | 95 |

The rubber compositions of Examples, prepared by mixing ENR with butadiene rubber and carbon black and adding predetermined amounts of aromatic oil and silica, showed high levels of the performance on snow and ice, wet performance, and abrasion resistance in good balance compared to the rubber compositions of Comparative Examples.

The invention claimed is:

1. A studless tire having a tread produced from a rubber composition for a studless tire, comprising:
    a rubber component including epoxidized natural rubber and butadiene rubber;
    aromatic oil;
    silica; and
    carbon black,
    wherein the epoxidized natural rubber is present in an amount of 1 to 60% by mass and the butadiene rubber is present in an amount of 10 to 80% by mass, based on 100% by mass of the rubber component, and
    the aromatic oil is present in an amount of 30 to 80 parts by mass and the silica is present in an amount of 30 to 80 parts by mass, relative to 100 parts by mass of the rubber component.

2. The studless tire according to claim 1, wherein the epoxidized natural rubber has an epoxidation degree of 2 to 35 mol %.

3. The studless tire according to claim 1, wherein the rubber composition further comprises natural rubber.

4. The studless tire according to claim 1, wherein the amount of the silica is 50% by mass or more based on 100% by mass of the sum of the amounts of the silica and the carbon black.

5. The studless tire according to claim 1, wherein the rubber component further comprises natural rubber, and wherein the butadiene rubber, the epoxidized natural rubber and the natural rubber are present in a total amount of 80% by mass or more based on 100% by mass of the rubber component in the rubber composition.

6. The studless tire according to claim 1, wherein the amount of the aromatic oil is 45 to 80 parts by mass and the amount of the silica is 45 to 80 parts by mass, relative to 100 parts by mass of the rubber component.

7. The studless tire according to claim 1, wherein the carbon black has an average particle size of 31 nm or smaller and/or a DBP oil adsorption of 100 ml/100 g or more, and a nitrogen absorption specific surface area of 80 to 200 m$^2$/g.

8. The studless tire according to claim 1, wherein an amount of the carbon black is 2 to 50 parts by mass, relative to 100 parts by mass of the rubber component.

9. The studless tire according to claim 1, wherein the rubber composition further comprises a sulfenamide vulcanization accelerator and/or a guanidine vulcanization accelerator.

10. The studless tire according to claim 1, wherein the amount of the aromatic oil is 60 to 80 parts by mass, relative to 100 parts by mass of the rubber component.

* * * * *